US007072142B2

(12) United States Patent
Lam

(10) Patent No.: US 7,072,142 B2
(45) Date of Patent: Jul. 4, 2006

(54) APPARATUS FOR PROVIDING TRANSVERSE MAGNETIC BIAS PROXIMATE TO A POLE TIP TO SPEED UP THE SWITCHING TIME OF THE POLE-TIP DURING THE WRITING OPERATION

(75) Inventor: Quan-Chiu Harry Lam, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 162 days.

(21) Appl. No.: 10/628,790

(22) Filed: Jul. 28, 2003

(65) Prior Publication Data

US 2005/0024768 A1    Feb. 3, 2005

(51) Int. Cl.
*G11B 5/147*    (2006.01)
(52) U.S. Cl. ............................ 360/126
(58) Field of Classification Search ........ 360/123–126, 360/115
See application file for complete search history.

(56) References Cited

U.S. PATENT DOCUMENTS

| | | | |
|---|---|---|---|
| 3,893,187 A * | 7/1975 | Kanai et al. ................. 360/115 |
| 5,159,511 A | 10/1992 | Das | |
| 5,546,254 A | 8/1996 | Gill | |
| 5,550,796 A * | 8/1996 | Ishii ......................... 369/13.17 |
| 5,557,491 A | 9/1996 | Gill et al. | |
| 6,449,131 B1 | 9/2002 | Guo et al. | |
| 6,671,127 B1 * | 12/2003 | Hsu et al. .................... 360/123 |
| 2003/0039068 A1 * | 2/2003 | Crawford et al. ........... 360/126 |
| 2005/0018347 A1 * | 1/2005 | Hsiao et al. ................. 360/128 |

OTHER PUBLICATIONS

Mallinson, John C., "Damped Gyromagnetic Switching," *IEEE Transactions on Magnetics*, vol. 36, No. 4, Jul. 2000.

* cited by examiner

*Primary Examiner*—A. J. Heinz
(74) *Attorney, Agent, or Firm*—Chambliss, Bahner & Stophel; David W. Lynch

(57) ABSTRACT

An apparatus for providing transverse magnetic bias proximate to a pole tip to speed up the switching time of the pole-tip during the writing operation is disclosed. The transverse field disposed proximate the pole-tip helps the conventional driving field in rotating the magnetization through the first 90-degrees, especially at small angle where the effective anisotropy-field is strongest in opposing the conventional driving field. By offsetting the magnetization from its easy-axis, the transverse field also increases the torque that the collinear driving field would have on the magnetization.

27 Claims, 12 Drawing Sheets

APPARATUS FOR PROVIDING TRANSVERSE MAGNETIC BIAS PROXIMATE TO A POLE TIP TO SPEED UP THE SWITCHING TIME OF THE POLE-TIP DURING THE WRITING OPERATION

BACKGROUND OF THE INVENTION

1. Field of the Invention

This invention relates in general to magnetic transducers, and more particularly to an apparatus for providing transverse magnetic bias proximate to a pole tip.

2. Description of Related Art

The first disk drive was introduced in the 1950s and included 50 magnetic disks that were 24-inch in diameter rotating at 1200 RPM (rotations per minute). There has been huge progress in the field of hard disk drive (HDD) technology in almost 50 years since the introduction of the first disk drive. Moreover, the rate of this progress is increasing year after year. Such success has made hard disk storage by far the most important member of the storage hierarchy in modern computers.

The most important customer attributes of disk storage are the cost per megabyte, data rate, and access time. In order to obtain the relatively low cost of hard disk storage compared to solid state memory, the customer must accept the less desirable features of this technology, which include a relatively slow response, high power consumption, noise, and the poorer reliability attributes associated with any mechanical system. On the other hand, disk storage has always been nonvolatile; i.e., no power is required to preserve the data, an attribute which in semiconductor devices often requires compromises in processing complexity, power-supply requirements, writing data rate, or cost.

Improvements in areal density have been the chief driving force behind the historic improvement in hard disk storage cost. In fact, the areal density of magnetic disk drives continue to increase, with currently commercially disk drives available with areal densities over 100 billion bits per square inch. While nature allows us to scale down the size of each bit of information, it does not allow scaling to happen forever. Furthermore, while these difficulties have been associated with hard disk drives, similar conclusions would apply to magnetic tape and other magnetic technologies.

Today, as the magnetic particles that make up recorded data on a hard disk drive become ever smaller, technical difficulties in writing and reading such small bits occur. Further, as areal density increases, the requirements put on head designs will change.

The most important customer attributes of disk storage are the cost per megabyte, data rate, and access time. However, improvements in areal density have been the chief driving force behind the historic improvement in hard disk storage cost. However, the present problems encountered in increasing areal density are more fundamental than problems encountered previously. These problems include the thermodynamics of the energy stored in a magnetic bit, difficulties with head-to-disk spacings that are only an order of magnitude larger than an atomic diameter, and the intrinsic switching speeds of magnetic materials.

One area that is increasing steadily is the data transfer rate. The signal frequency of the current state of the hard disk drives continues to rise. Basic scaling for magnetic recording is the same as the scaling of any three-dimensional magnetic field solution: If the magnetic properties of the materials are constant, the field configuration and magnitudes remain unchanged even if all dimensions are scaled by the factor s, so long as any electrical currents are also scaled by s. In the case of magnetic recording, there is the secondary question of how to scale the velocity or data rate to keep the dynamic effects mathematically unchanged. Unfortunately, there is no simple choice for scaling time that leaves both induced currents and electromagnetic wave propagation unchanged. Instead, surface velocity between the head and disk is usually kept unchanged. This is closer to engineering reality than other choices. It means that induced eddy currents and inductive signal voltages become smaller as the scaling proceeds downward in size.

Therefore, if we wish to increase the linear density (that is, bits per inch of track) by 2, the track density by 2, and the areal density by 4, we simply scale all of the dimensions by half; leave the velocity the same, and double the data rate. If the materials have the same properties in this new size and frequency range, everything works as it did before.

That constitutes the first-order scaling. In real life, there are a number of reasons why this simple scaling is never followed completely. For magnetoresistive (MR) heads, the scaling laws are more complex, but tend to favor MR increasingly over inductive heads as size is decreased. The last reason, which will ultimately cause very fundamental problems, is that the materials are not unchanged under the scaling process; we are reaching physical dimensions and switching times in the head and media at which electrical and magnetic properties are different than they were at lower speeds and at macroscopic sizes.

In today's recording density, in particular with high track-per-inch, the track-width of the write-head (P2B) is getting ever smaller. In the state-of-the-art server-drive, P2B is already approaching the neighborhood of 0.25 um. For desktop and laptop drives, P2B is even smaller because of the higher areal density required of those applications. On the other hand, the data-rate is getting higher. In the case of server-drives, the data-rate is approaching 1 Gb/sec.

The problems associated with the increased data rates described above involve the switching the magnetization of the pole-tip. Switching of the magnetization of the pole-tip at such a high data-rate, especially with the pole-tip dimensions being comparable to or even smaller than those of a single magnetic domain, is becoming a serious challenge. There has been experimental evidence that the pole-tip's magnetization is switching much slower than that of the much wider yoke in the back. In fact, there are even indications that for a very narrow pole-tip and at high enough frequencies, the pole-tip is no longer acting as a soft-magnet but almost as a tiny single-domain hard-magnet, with its magnetization being switched back and forth to do the high data-rate writing.

The sluggishness of the pole-tip switching action is partially due to the significant shape- and stress-induced longitudinal anisotropy, which is caused by its small dimension and elongated shape. Accordingly, the problem of enhancing the pole-tip magnetization switching in the presence of significant longitudinal anisotropy (be it shape- and stress-induced) needs to be addressed.

Recently, the switching time of a single-domain particle with uniaxial anisotropy and collinear applied magnetic field has been addressed. See, for example, J. C. Mallinson, IEEE Trans. Magn., Vol-36, pp. 1976–1981, July, 2000, which is incorporated herein by reference. One particular observation is that the time to rotate the magnetization to a 90-degree polar angle (from near-zero) is always greater than the time to proceed from 90-degrees to near 180-degrees in the presence of an applied field collinear with the easy axis. This is because of the dependence of the effective anisotropy field $H_k$ on the polar angle theta ($\Theta$), in which $H_k$ is proportional to $\cos(\Theta)$. In other words, it is because the effective $H_k$ opposes the switching in the first 90-degrees, i.e., 0° to 90°, while it helps the switching in the second 90°, i.e., 90° to 180°, of the total switching process. Also, the magnitude of the effective $H_k$ is stronger at 0° than at 90°. However, the single-domain particle model with uniaxial anisotropy and the collinear applied field is a rather simple and ideal case.

In contrast, with regard to the problem of enhancing the pole-tip magnetization switching, the elongated shape (currently about 0.25 um wide, 1.2 um high, and 2 um long) almost guarantees that the shape-anisotropy is perpendicular to the ABS (air-bearing-surface), longitudinal to the pole-tip. In addition, the driving flux transduced by the yoke further back in the writer is injected into the pole-tip region at its back-end, almost collinear to the shape-anisotropy axis.

The problem of slow magnetic-switching of the pole-tip is usually tackled by introducing an overshoot in the write-current during the current switch. This current-overshoot provides an extra driving field to overcome the initial hurdle in switching the pole-tip magnetization. However, the extra driving-field given by current-overshoot has side effects such as creating excessive erase-band, extra adjacent-track-interference (ATI), and extra protrusion.

It can be seen that there is a need for an apparatus for providing transverse magnetic bias proximate to a pole tip to speed up the switching time of the pole-tip during the writing operation.

SUMMARY OF THE INVENTION

To overcome the limitations in the prior art described above, and to overcome other limitations that will become apparent upon reading and understanding the present specification, the present invention discloses an apparatus for providing transverse magnetic bias proximate to a pole tip to speed up the switching time of the pole-tip during the writing operation.

The present invention solves the above-described problems by providing a transverse field proximate the pole-tip to help the conventional driving field in rotating the magnetization through the first 90-degrees, especially at small angle where the effective anisotropy-field is strongest in opposing the conventional driving field. By offsetting the magnetization from its easy-axis, the transverse field not only decreases the initial effective anisotropy field $H_k$ that is opposing the switching, but also increases the torque that the collinear driving field would have on the magnetization.

An assisted pole tip arrangement in accordance with the principles of the present invention includes a pole tip and a magnetic bias field source disposed proximate to the pole tip for providing a magnetic bias field for enhancing magnetization switching of the pole tip.

In another embodiment of the present invention, a magnetic head is provided. The magnetic head includes a first pole and a second pole, the first and second pole being separated to form a write gap at a pole tip, a coil disposed between the first and second poles for producing at the write gap magnetic fields used to record data and a magnetic bias field source disposed proximate to the pole tip for providing a magnetic bias field for enhancing magnetization switching of the pole tip.

In another embodiment of the present invention, a magnetic data storage system is provided. The magnetic data storage system includes at least one magnetic storage medium, a magnetic head, for reading data from and writing data to the at least one magnetic storage medium, a media translater for moving the at least one magnetic storage medium relative to the transducer and a signal processing system, coupled to the media translater and to the magnetic head, for processing signals for the magnetic head and for controlling the media translater, wherein the magnetic head further comprises a first pole and a second pole, the first and second pole being separated to form a write gap at a pole tip, a coil disposed between the first and second poles for producing at the write gap magnetic fields used to record data and a magnetic bias field source disposed proximate to the pole tip for providing a magnetic bias field for enhancing magnetization switching of the pole tip.

In another embodiment of the present invention, another magnetic head is provided. This magnetic head includes means for providing magnetic fields for recording data on a magnetic recording medium and means, operatively coupled to the means for providing magnetic field for recording data on a magnetic recording medium, for providing a magnetic bias field for enhancing magnetization switching of the means for providing magnetic fields for recording data on a magnetic recording medium.

In another embodiment of the present invention, another magnetic data storage system is provided. This magnetic data storage system includes means for providing a path for magnetic fields used to record data on a magnetic recording medium, means, coupled to the means for providing a path, for producing the magnetic fields used to record data and means, coupled to the means for providing a path, for providing a magnetic bias field for enhancing magnetization switching of the means for providing a path for magnetic fields.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides an apparatus for providing transverse magnetic bias proximate to a pole tip to speed up the switching time of the pole-tip during the writing operation. The transverse field disposed proximate the pole-tip helps the conventional driving field in rotating the magnetization through the first 90-degrees, especially at small angle where the effective anisotropy-field is strongest in opposing the conventional driving field. By offsetting the magnetization from its easy-axis, the transverse field also increases the torque that the collinear driving field would have on the magnetization.

Figure 1:
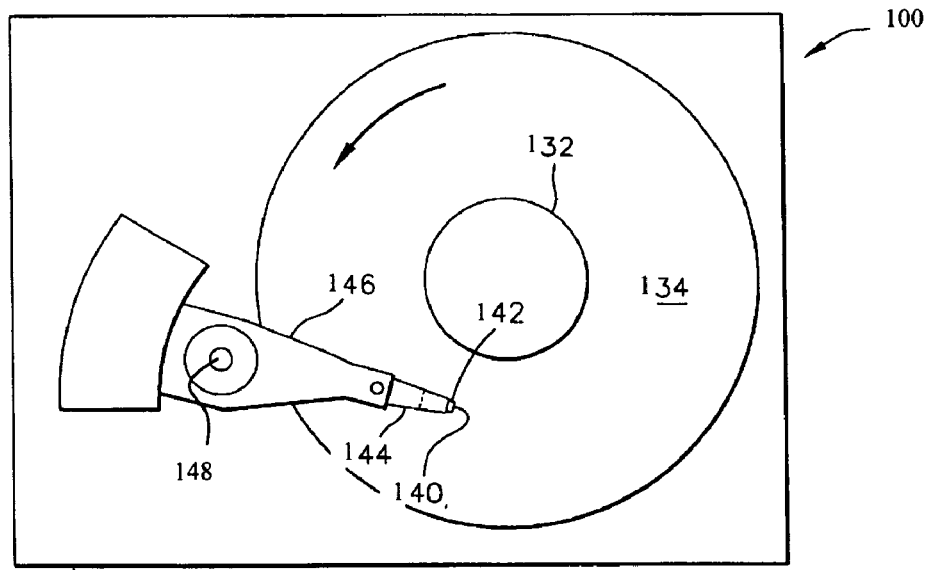
FIG. 1 illustrates a storage system according to the present invention.

FIG. 1 illustrates a storage system 100 according to the present invention. In FIG. 1, a transducer 140 is under control of an actuator 148. The actuator 148 controls the position of the transducer 140. The transducer 140 writes and reads data on magnetic media 134 rotated by a spindle 132. A transducer 140 is mounted on a slider 142 that is supported by a suspension 144 and actuator arm 146. The suspension 144 and actuator arm 146 positions the slider 142 so that the magnetic head 140 is in a transducing relationship with a surface of the magnetic disk 134.

Figure 2:
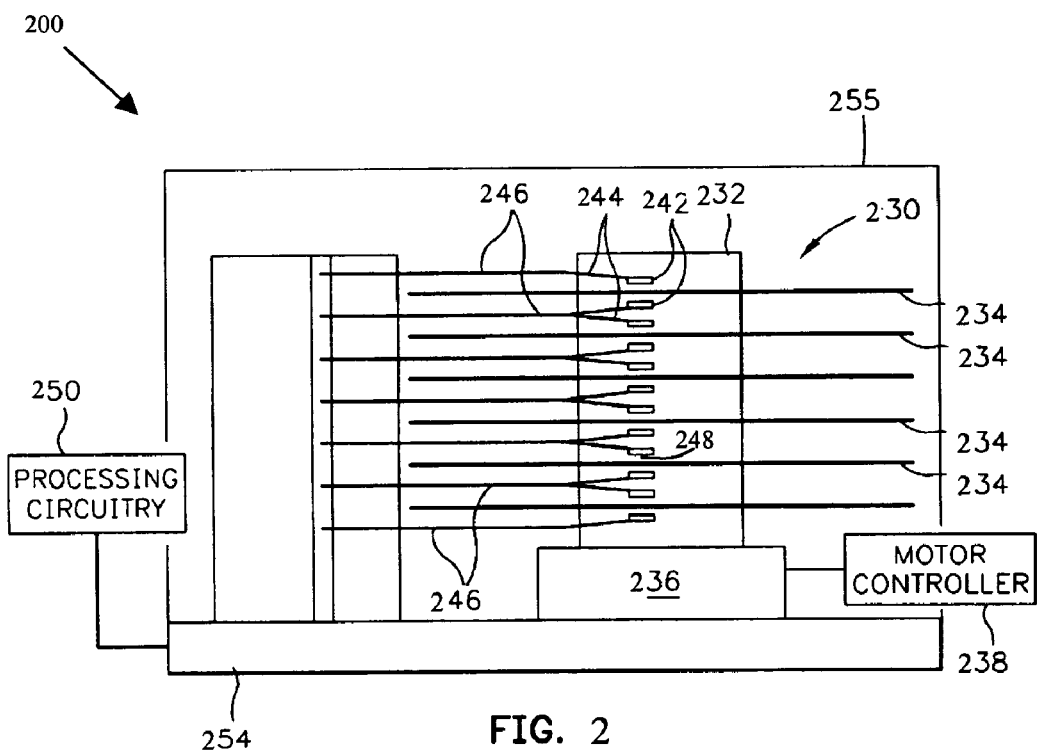
FIG. 2 illustrates one particular embodiment of a storage system according to the present invention.

FIG. 2 illustrates one particular embodiment of a storage system 200 according to the present invention. In FIG. 2, a hard disk drive 230 is shown. The drive 230 includes a spindle 232 that supports and rotates magnetic disks 234. A motor 236, mounted on a frame 254 in a housing 255, which is controlled by a motor controller 238, rotates the spindle 232. A combined read and write magnetic head is mounted on a slider 242 that is supported by a suspension 244 and actuator arm 246. Processing circuitry 250 exchanges signals, representing such information, with the head, provides motor drive signals for rotating the magnetic disks 234, and provides control signals for moving the slider to various tracks. The plurality of disks 234, sliders 242 and suspensions 244 may be employed in a large capacity direct access storage device (DASD).

When the motor 236 rotates the disks 234 the slider 242 is supported on a thin cushion of air (air bearing) between the surface of the disk 234 and the air bearing surface (ABS) 248. The magnetic head may then be employed for writing information to multiple circular tracks on the surface of the disk 234, as well as for reading information therefrom.

Figure 3:
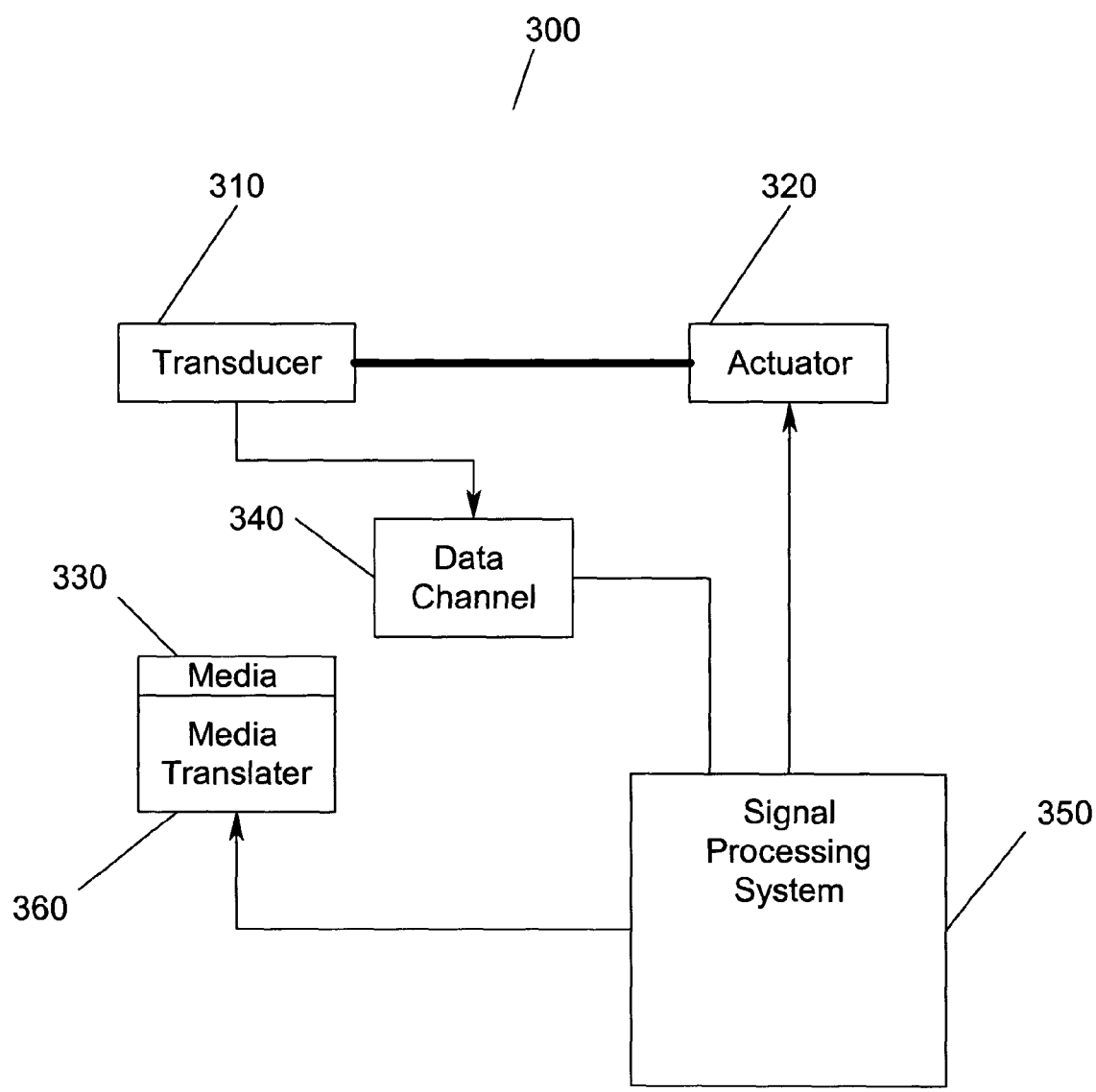
FIG. 3 illustrates a storage system according to the present invention.

FIG. 3 illustrates a storage system 300. In FIG. 3, a transducer 310 is under control of an actuator 320. The actuator 320 controls the position of the transducer 310. The transducer 310 writes and reads data on magnetic media 330. The read/write signals are passed to a data channel 340. A signal processor system 350 controls the actuator 320 and processes the signals of the data channel 340. In addition, a media translator 360 is controlled by the signal processor system 350 to cause the magnetic media 330 to move relative to the transducer 310. Nevertheless, the present invention is not meant to be limited to a particular type of storage system 300 or to the type of media 330 used in the storage system 300.

Figure 4:
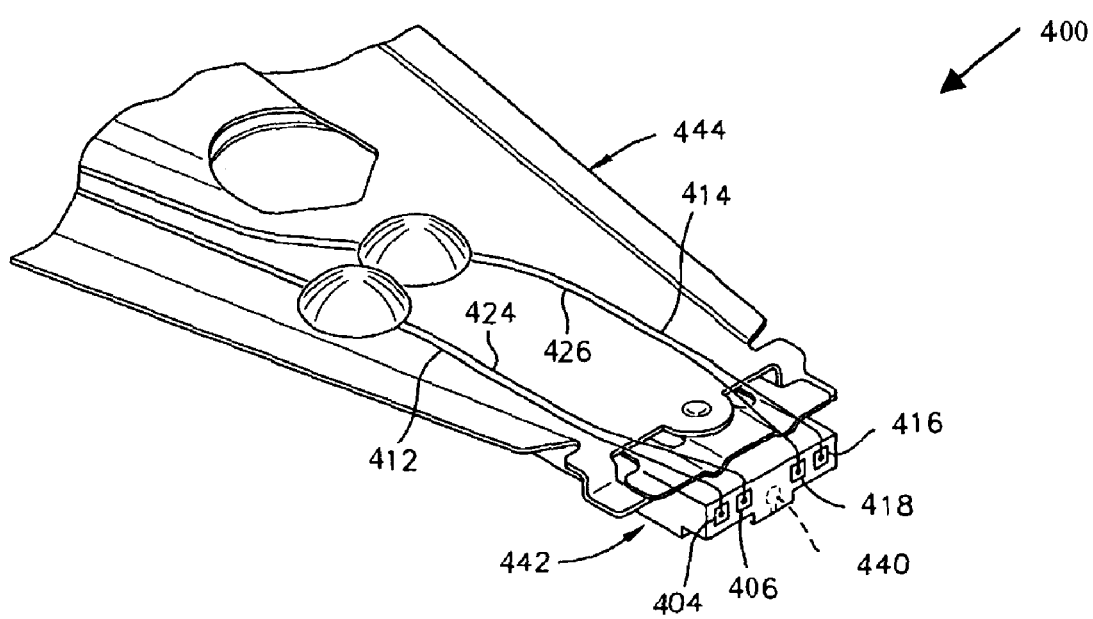
FIG. 4 is an isometric illustration of a suspension system for supporting a slider having a magnetic head mounted thereto.

FIG. 4 is an isometric illustration of a suspension system 400 for supporting a slider 442 having a magnetic head mounted thereto. In FIG. 4 first and second solder connections 404 and 406 connect leads from the sensor 440 to leads 412 and 424 on the suspension 444 and third and fourth solder connections 416 and 418 connect the coil to leads 414 and 426 on the suspension 444. However, the particular locations of connections may vary depending on head design.

Figure 5:
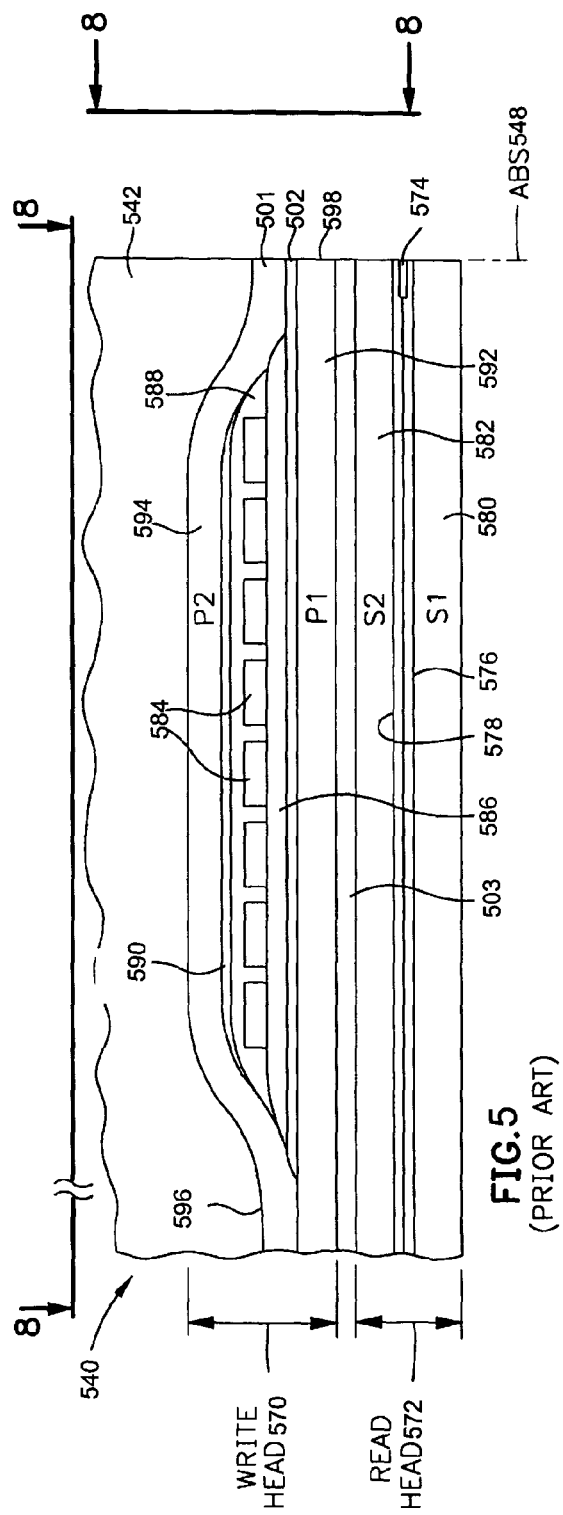
FIG. 5 is a side cross-sectional elevation view of a magnetic head.
Figure 6:
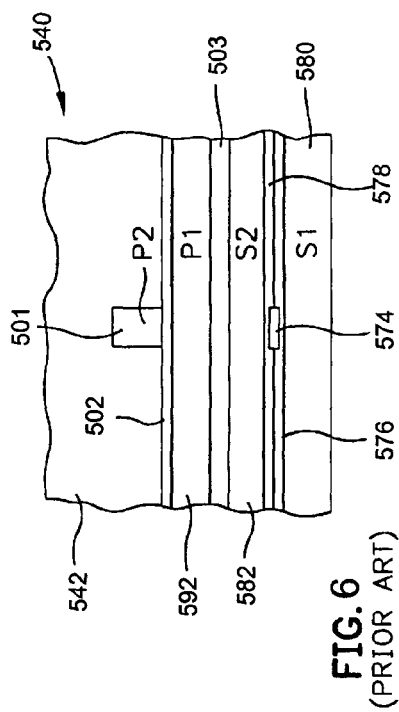
FIG. 6 is an air bearing surface (ABS) view of the magnetic head of FIG. 5.

FIG. 5 is a side cross-sectional elevation view of a magnetic head 540. The magnetic head 540 includes a write head portion 570 and a read head portion 572. The read head portion 572 includes a sensor 574. FIG. 6 is an ABS view of the magnetic head of FIG. 5. The sensor 574 is sandwiched between first and second gap layers 576 and 578, and the gap layers are sandwiched between first and second shield layers 580 and 582. In a piggyback head as shown in FIG. 5, the second shield layer (S2) 582 and the first pole piece (P1) 592 are separate layers. The first and second shield layers 580 and 582 protect the MR sensor element 574 from adjacent magnetic fields. More conventionally, the second shield 582 also functions as the first pole (P1) 592 of the write element, giving rise to the term "merged MR head." However, the present invention is not meant to be limited to a particular type of MR head.

In response to external magnetic fields, the resistance of the sensor 574 changes. A sense current Is conducted through the sensor causes these resistance changes to be manifested as voltage changes. These voltage changes are then processed as readback signals by the signal processing system 350 shown in FIG. 3.

The write head portion of the magnetic head includes a coil layer 584 sandwiched between first and second insulation layers 586 and 588. A third insulation layer 590 may be employed for planarizing the head to eliminate ripples in the second insulation layer caused by the coil layer 584. The first, second and third insulation layers are referred to in the art as an "insulation stack." The coil layer 584 and the first, second and third insulation layers 586, 588 and 590 are sandwiched between first and second pole piece layers 592 and 594. The first and second pole piece layers 592 and 594 are magnetically coupled at a back gap 596 and have first and second pole tips 598 and 501 which are separated by a write gap layer 502 at the ABS. The first pole piece layer 592 is separated from the second shield layer 582 by an insulation layer 503.

Figure 7:
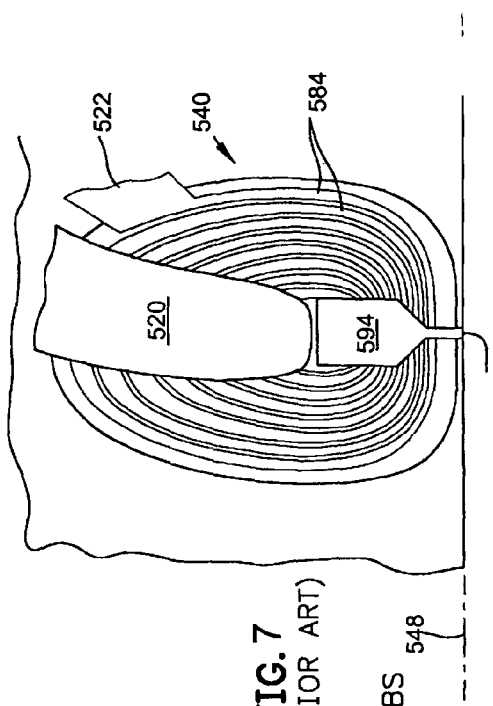
FIG. 7 illustrates the connect leads coupled to the coil for the write pole piece.

FIG. 7 illustrates a view of the connect leads 520, 522 coupled to the coil 584 for the write pole piece 594. As shown in FIGS. 4–7, first and second solder connections 404 and 406 connect leads from the sensor 574 to leads 412 and 414 on the suspension 444, and third and fourth solder connections 416 and 418 connect leads 520 and 522 from the coil 584 (see FIG. 7) to leads 424 and 426 on the suspension.

Figure 8:
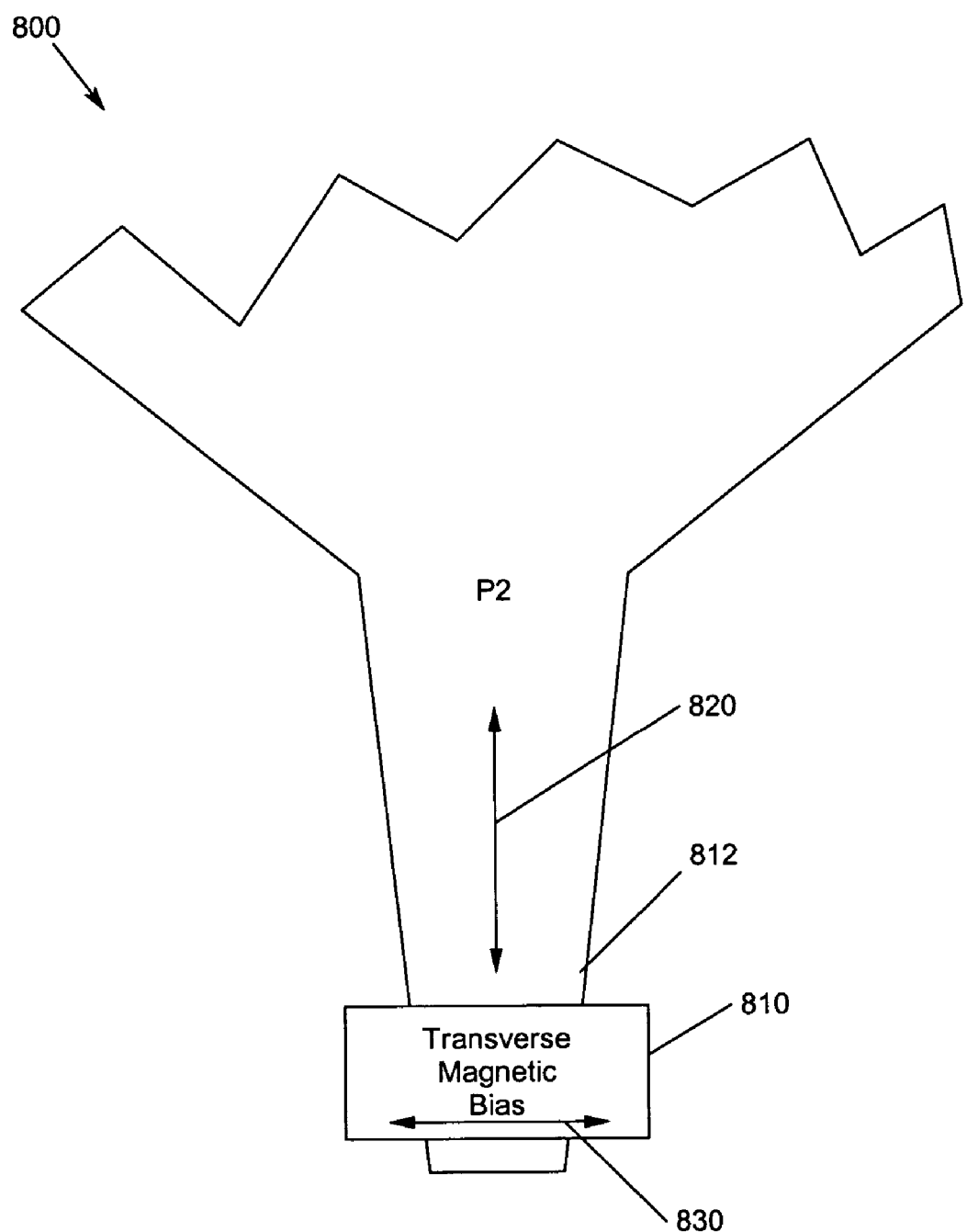
FIG. 8 illustrates a write head having a transverse magnetic bias proximate the pole-tip according to one embodiment of the present invention.

FIG. 8 illustrates a write head 800 having a transverse magnetic bias 810 proximate the pole-tip 812 according to one embodiment of the present invention. In FIG. 8, a transverse magnetic bias structure 810 is disposed proximate P2 812. The transverse magnetic field 830 provided by the transverse magnetic bias 810 helps the conventional driving field to rotate the magnetization through the first 90-degrees. By offsetting the magnetization from its easy-axis 820, the transverse field 830 also increases the torque that the collinear driving field would have on the magnetization. In other words, the transverse field 830 would: (1) decrease effective anisotropy-field opposing the driving-field; (2) increase the initial torque that the driving field has on the magnetization.

The transverse magnetic bias structure 810 may be an external magnet, e.g., at the file-level. Such a magnet would provide a moderate field 830 to transverse bias the write-field, but not strong enough to erase data on the media. Alternatively, the transverse magnetic bias 810 may be provided in-situ by the head itself. Still, further, the transverse magnetic bias 810 may be constructed to generate the field 830 using the write-current. This last arrangement would provide the advantages of not requiring drastic arms-electronics modifications; e.g., no extra current source required. However, those skilled in the art will recognize that the present invention is not limited to the application of magnetic fields that are perfectly transverse to the pole tip axis, but may be arranged consistent with assisting the conventional driving field to rotate the magnetization.

Figure 9:
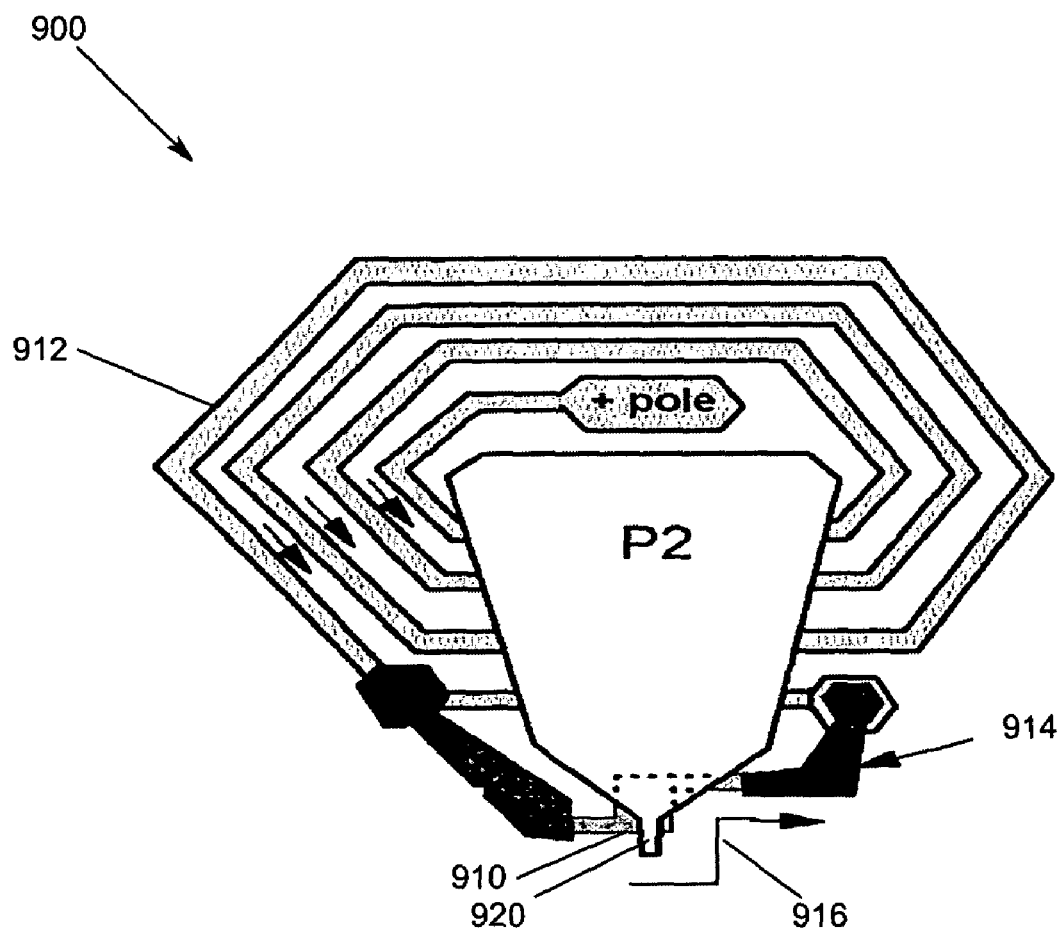
FIG. 9 illustrates a transverse magnetic bias at the pole-tip according to one embodiment of the present invention.

FIG. 9 illustrates a transverse magnetic bias at the pole-tip 900 according to one embodiment of the present invention. In FIG. 9, the transverse magnet 910 is coupled to the coil 912 proximate to the pole-tip 920. Thus, an extra current source for the biasing is not needed.

In order to bring the bias-magnetic-field closer to the pole-tip 920, it may be desirable for the magnetic bias 910 to be made of a thin-film material so that the magnetic bias 910 may be located as physically close to the pole-tip 920 as possible. However, the magnetic bias 910 may be formed and linked with a thicker film 914, i.e., thicker than the magnetic bias 910 itself, which is close to the pole-tip 920, so that the overall resistance of the magnetic-bias structure 910, 914 is as low as possible. The bias-current path 916 provides a transverse field bias. In the switching of the pole-tip magnetization in a writer, from one polarity to the other, the first 90-degrees of the switching is the slowest. There are several reasons for this. First, the initial torque of the driving field on the magnetization is small due to the small angle. Second, the effective anisotropy-field, which is proportional to the cosine of the angle, is largest at the small initial angle; and most importantly, this effective anisotropy-field is acting against the driving field during the first 90-degrees of the switching.

In contrast, in the second 90-degrees of the switching, the shape and stress anisotropy-field is helping the switching. The transverse magnet 910 enhances the switching by biasing the magnetization transversely, thus increasing the initial torque exerted by the driving-field on the magnetization and bypassing the region where the strongest opposing effective anisotropy-field is present.

Figure 10:
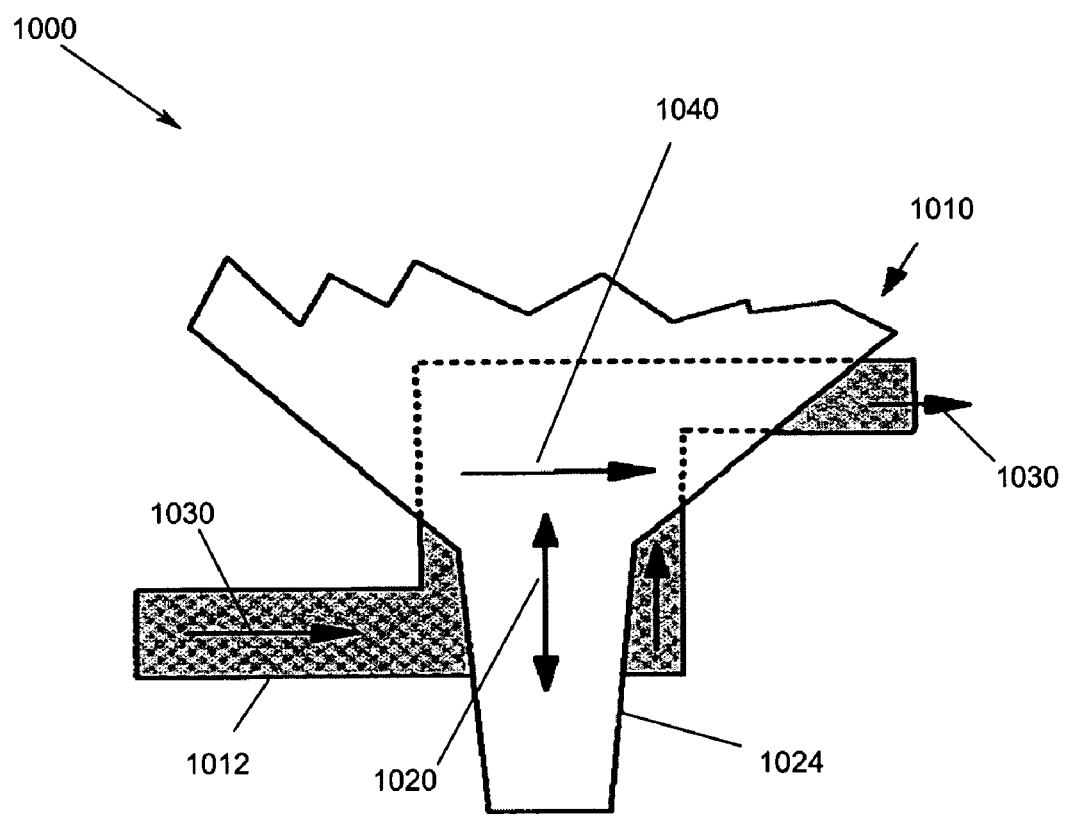
FIG. 10 illustrates an enlarged top view of the pole-tip and the transverse magnetic bias of FIG. 9.

FIG. 10 illustrates an enlarged top view 1000 of the pole-tip and the transverse magnetic bias of FIG. 9. FIG. 10 shows the second pole (P2) 1010 disposed proximate the transverse magnetic bias 1012. The direction of the shape/stress anisotropy easy-axis 1020 at the pole-tip region 1024 is represented by the arrow. The bias current 1030 obtained via the current flowing through the write coil flows through the transverse magnetic bias 1012. The transverse magnetic bias-field 1040 that is generated by the bias-current 1030 on the second pole-tip region 1024 facilitates pole-tip magnetization switching.

Figure 11:
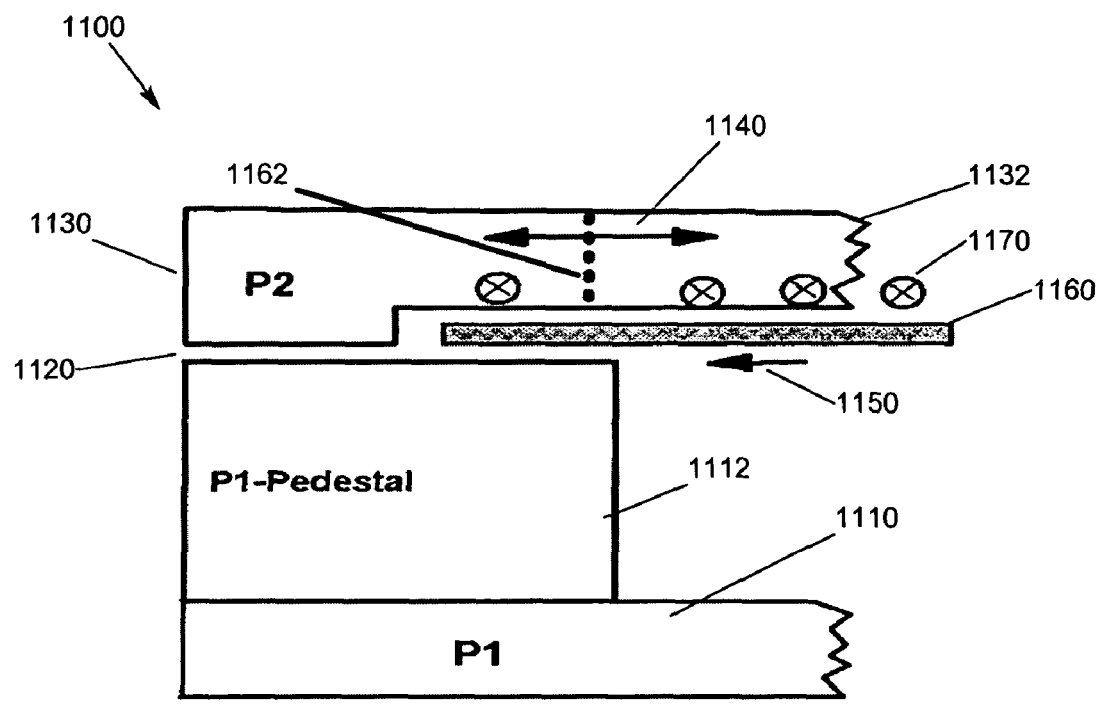
FIG. 11 illustrates a longitudinal cross-section view of the pole-tip and the transverse magnetic bias of FIG. 9.

FIG. 11 illustrates a longitudinal cross-section view 1100 of the pole-tip and the transverse magnetic bias of FIG. 9. In FIG. 11, the first pole 1110 having the pedestal 1112 is shown forming the write gap 1120 with the pole-tip 1130 of the second pole 1132. Again, the direction of the shape/stress anisotropy easy-axis 1140 at the pole-tip region 1130 is represented by the arrow. The bias current 1150 obtained via the current flowing through the write coil flows through the transverse magnetic bias 1160. The transverse magnetic bias 1160 is shown relative to the pole flare 1162. The transverse magnetic bias-field 1170 is provided by the bias-current 1150.

Figure 12:
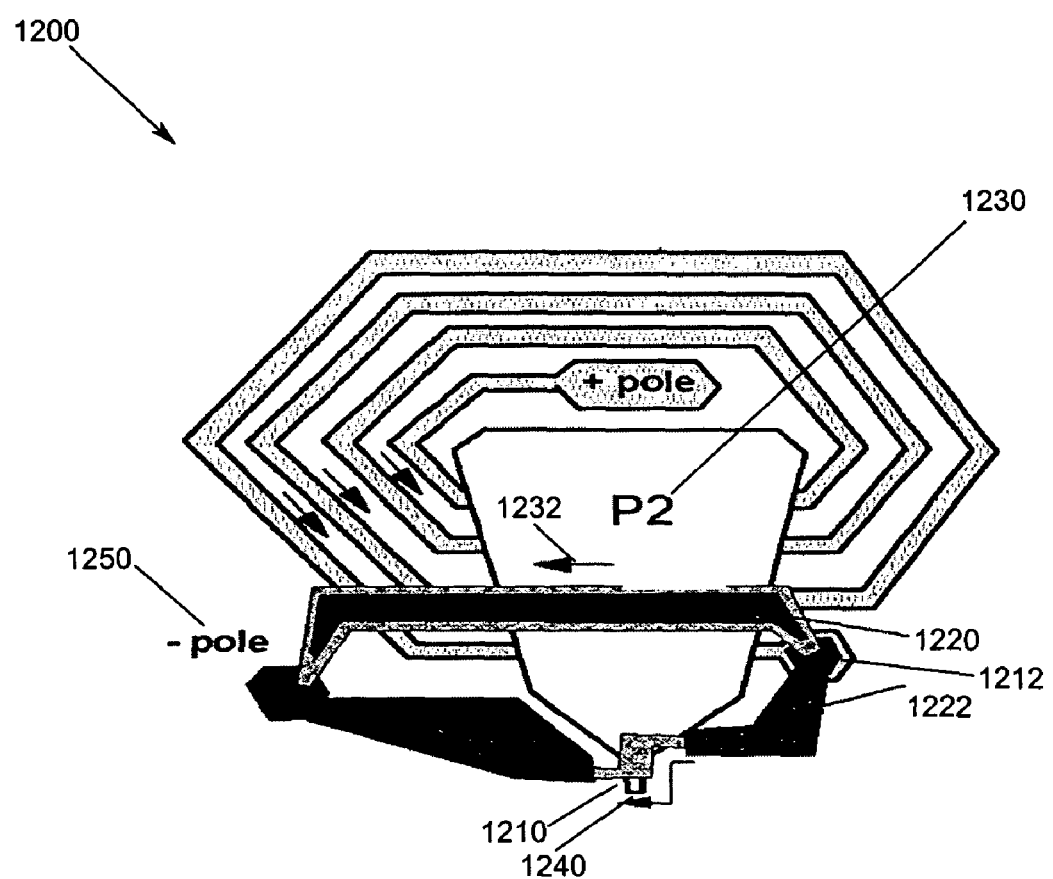
FIG. 12 illustrates a transverse magnetic bias at the pole-tip according to another embodiment of the present invention.

FIG. 12 illustrates a transverse magnetic bias at the pole-tip 1200 according to another embodiment of the present invention. In FIG. 12, the transverse magnetic bias 1210 is coupled to the coil 1212. Again, an extra current source for the biasing is not needed. For the same reason as explained in FIG. 9, it may be desirable that the transverse magnetic bias 1210 be made of thin film material in order to bring it physically as close to the pole tip 1240 as possible. The overall resistance of the magnetic bias structure may be reduced by linking 1210 with a thicker film 1222, i.e., thicker than magnetic bias 1210, thus minimizing the resistances of the current paths leading to transverse magnetic bias 1210.

The bias-current path provides a transverse field bias for assisting in switching of the pole-tip magnetization. In FIG. 12, the transverse magnetic bias 1210 includes two legs 1220, 1222. A first leg 1220 extends across P2 1230 while the second leg 1222 is arranged proximate the pole-tip 1240 of P2 1230. The second leg 1222 serves as the transverse magnetic-bias, while the first leg 1220 is optional because the main purpose of the first leg 1220 is to further reduce the additional resistance to the overall writer caused by this embodiment of the invention. The first leg can also be designed to control the optimal fraction of the total write-current to be used for the transverse bias. The current 1232 from the coil 1212 enters the two legs 1220, 1222 of the transverse magnetic bias 1210 and flows to the negative pole 1250 of the coil 1212 to close the circuit.

Figure 13:
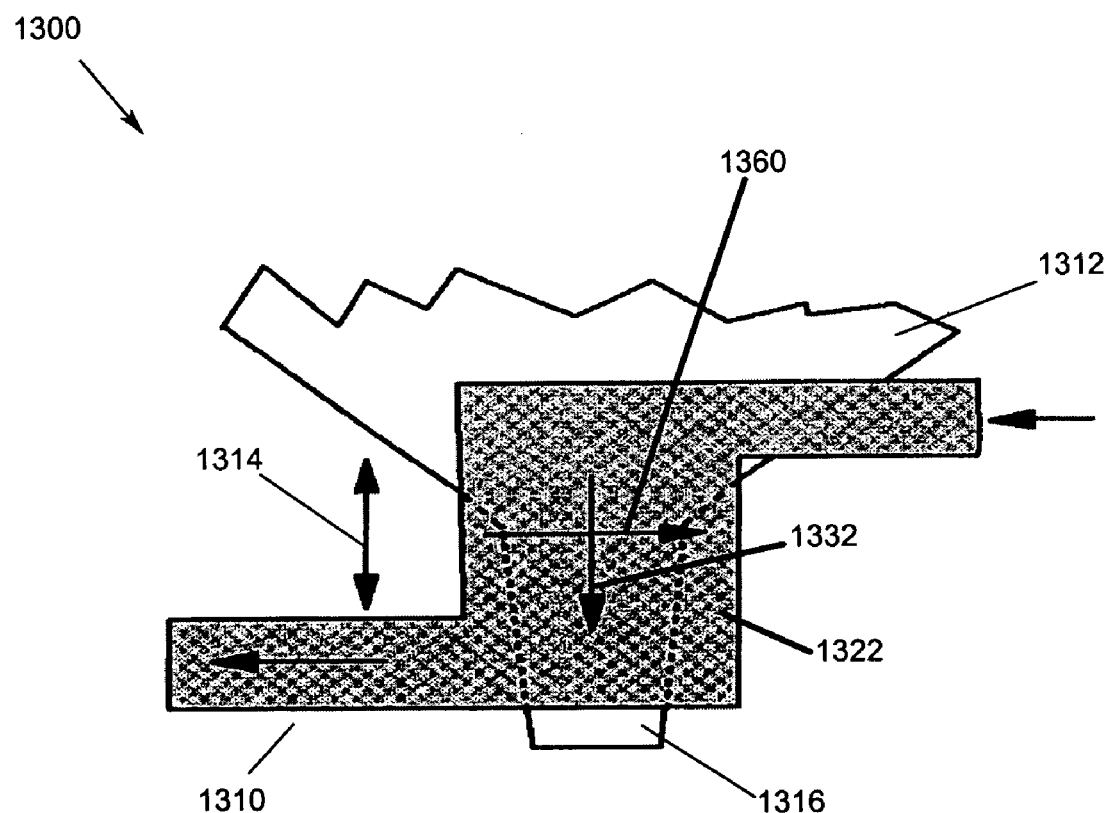
FIG. 13 illustrates an enlarged top view of the pole-tip and the transverse magnetic bias of FIG. 12.

FIG. 13 illustrates an enlarged top view 1300 of the pole-tip and the transverse magnetic bias of FIG. 12. FIG. 13 shows the second pole (P2) 1312 disposed proximate the second leg 1322 of the transverse magnetic bias 1310. The direction of the shape/stress anisotropy easy-axis 1314 at the pole-tip region 1316 is represented by the arrow. The bias current 1332 obtained via the current flowing through the write coil flows through the transverse magnet 1310. The transverse magnetic bias-field 1360 that is provided by the bias-current 1332 on the second pole-tip region 1316 facilitates pole-tip magnetization switching.

Figure 14:
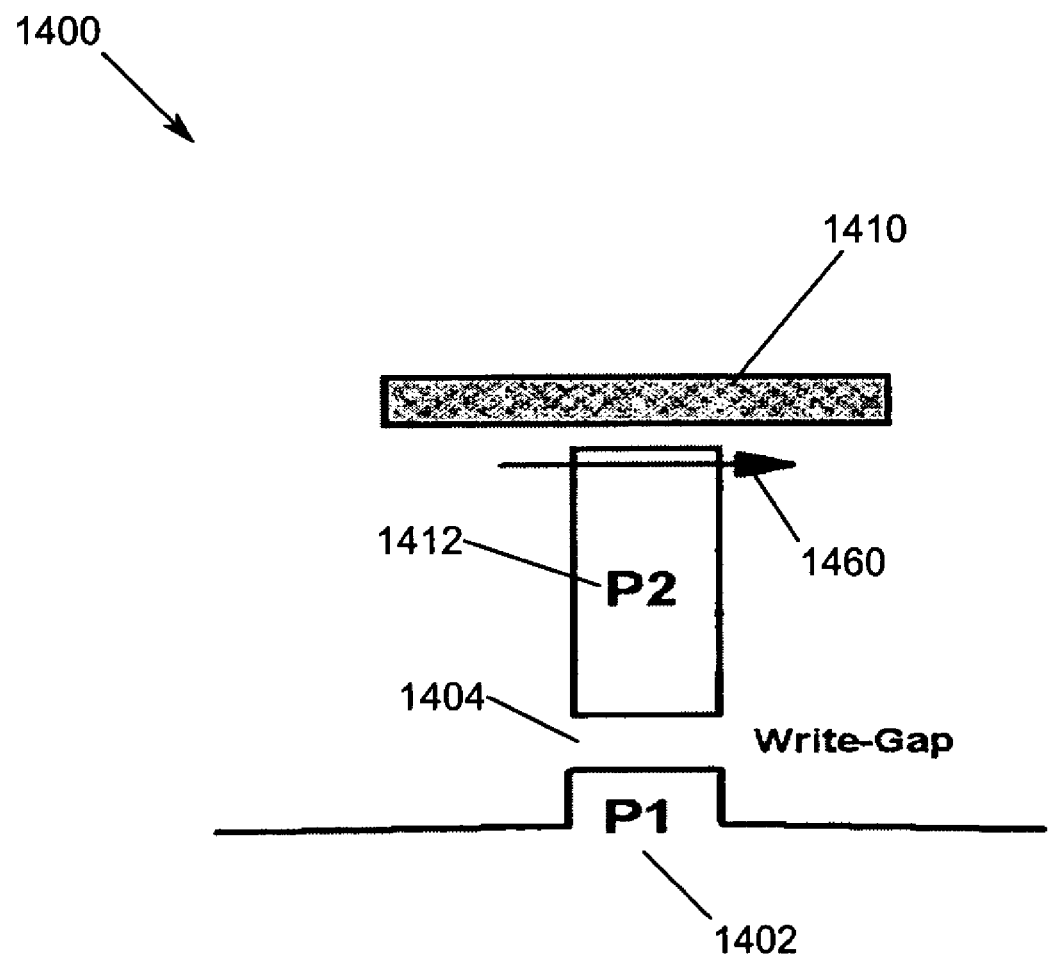
FIG. 14 illustrates a cross-sectional view of the pole-tip and the transverse magnetic bias of FIG. 12 from the perspective of the air bearing surface (ABS)

FIG. 14 illustrates a cross-sectional view 1400 of the pole-tip and the transverse magnetic bias of FIG. 12 from the perspective of the air bearing surface (ABS). In FIG. 14, the first pole 1402 is shown forming the write gap 1404 with the second pole-tip 1412. The bias current obtained via the current flowing through the write coil flows through the transverse magnetic bias perpendicular to the ABS (see FIG. 13). The transverse magnetic bias-field 1460 is generated by the bias-current flowing through the transverse magnet 1410 perpendicular to the ABS. Although P1 1402 and P2 1412 are exposed and thus directly observable at the ABS, the transverse magnetic bias field source 1410 is embedded beneath the surface in order to prevent the bias-current from shunting to the magnetic media.

Figure 15:
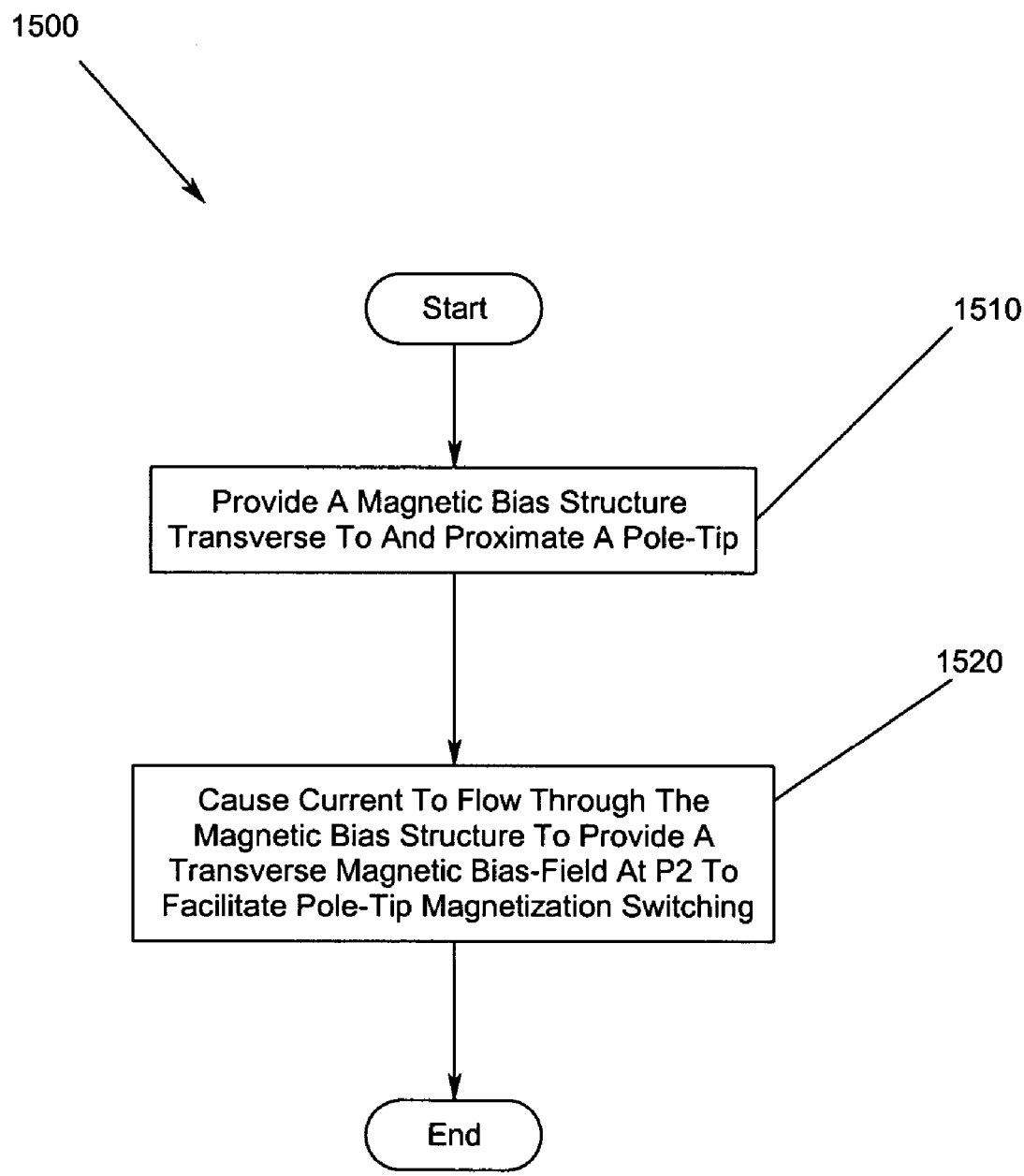
FIG. 15 is a flow chart for the method for providing transverse magnetic bias for assisting in rotating the magnetization through the first 90-degrees according to an embodiment of the present invention.

FIG. 15 is a flow chart for the method for providing transverse magnetic bias for assisting in rotating the magnetization through the first 90-degrees. In FIG. 15, a magnetic bias structure is disposed transverse to and proximate a pole-tip 1510. Current is caused to flow through the magnetic bias structure to provide a transverse magnetic bias-field at P2 to facilitate pole-tip magnetization switching 1520.

Accordingly, the transverse field disposed proximate the pole-tip helps the conventional driving field in rotating the magnetization through the first 90-degrees. By offsetting the magnetization from its easy-axis, the transverse field also increases the torque that the collinear driving field would have on the magnetization. However, the transverse-bias fields provided by the embodiments of the present invention do not generate additional magnetic fields in the media to cause erase-band and ATI. Rather, the transverse-bias fields provided by the embodiments of the present invention enhance the effectiveness of the conventional driving field on the pole-tip to reduce the requirement of write-current and in particular current-overshoot.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An assisted pole tip arrangement, comprising:
   a pole tip; and
   a magnetic bias field source disposed proximate to the pole tip for providing a magnetic bias field for enhancing magnetization switching of the pole tip;
   wherein the magnetic bias field is generated by bias-current flowing perpendicularly to an air bearing surface through the magnetic bias source.

2. The assisted pole tip arrangement of claim 1 wherein the pole tip comprises a longitudinal axis, the magnetic bias field being oriented substantially transverse to the longitudinal axis of the pole tip.

3. The assisted pole tip arrangement of claim 1 wherein the magnetic bias field source is an external magnet.

4. The assisted pole tip arrangement of claim 1 wherein the magnetic bias field source is a magnet provided in-situ proximate the pole tip.

5. The assisted pole tip arrangement of claim 1 wherein the magnetic bias field source comprises a current path in-situ proximate to the pole tip, the current path being coupled to a write coil for using a write current to provide the magnetic bias field.

6. The assisted pole tip arrangement of claim 5 wherein the current path comprises a single path proximate to the pole tip, the single path providing a parallel path for write current to flow.

7. The assisted pole tip arrangement of claim 5 wherein the current path comprises a first leg and a second leg, the first leg extending across the pole and the second leg arranged proximate to the pole tip.

8. The assisted pole tip arrangement of claim 5 wherein the first and second leg are disposed between the write coil and a negative pole of the write coil.

9. The assisted pole tip arrangement of claim 1 wherein the magnetic bias field is transverse to an easy axis of magnetization for the pole tip.

10. The assisted pole tip arrangement of claim 1 wherein the magnetic bias field decreases an effective anisotropy-field opposing a driving-field and increases initial torque that the driving field has on the magnetization.

11. The assisted pole tip arrangement of claim 1 further comprising a lead coupled to the magnetic bias field source, the lead being formed with a thickness greater than a thickness of the magnetic bias field source to lower overall resistance.

12. A magnetic head, comprising:
   a first pole and a second pole, the first and second pole being separated to form a write gap at a pole tip;
   a coil disposed between the first and second poles for producing at the write gap magnetic fields used to record data; and
   a magnetic bias field source disposed proximate to the pole tip for providing a magnetic bias field for enhancing magnetization switching of the pole tip;
   wherein the magnetic bias field is generated by bias-current flowing through the magnetic bias field source perpendicular to an air bearing surface.

13. The magnetic head of claim 12 wherein the pole tip comprises a longitudinal axis, the magnetic bias field being oriented substantially transverse to the longitudinal axis of the pole tip.

14. The magnetic head of claim 12 wherein the magnetic bias field source is an external magnet.

15. The magnetic head of claim 12 wherein the magnetic bias field source is a magnet provided in-situ proximate the pole tip.

16. The magnetic head of claim 12 wherein the magnetic bias field source comprises a current path in-situ proximate to the pole tip, the current path being coupled to a write coil for using a write current to provide the magnetic bias field.

17. The magnetic head of claim 16 wherein the current path comprises a single path proximate to the pole tip, the single path providing a parallel path for write current to flow.

18. The magnetic head of claim 16 wherein the current path comprises a first leg and a second leg, the first leg extending across the pole and the second leg arranged proximate to the pole tip.

19. The magnetic head of claim 16 wherein the first and second leg are disposed between the write coil and a negative pole of the write coil.

20. The magnetic head of claim 12 wherein the magnetic bias field is transverse to an easy axis of magnetization for the pole tip.

21. The magnetic head of claim 12 wherein the magnetic bias field decreases an effective anisotropy-field opposing a driving-field and increases initial torque that the driving field has on the magnetization.

22. The magnetic head of claim 12 further comprising a lead coupled to the magnetic bias field source, the lead being formed with a thickness greater than a thickness of the magnetic bias field source to lower overall resistance.

23. A magnetic data storage system, comprising:
   at least one magnetic storage medium;
   a magnetic head, for reading data from and writing data to the at least one magnetic storage medium;
   a media translater for moving the at least one magnetic storage medium relative to the transducer; and a signal processing system, coupled to the media translater and to the magnetic head, for processing signals for the magnetic head and for controlling the media translater;

wherein the magnetic head further comprises:
  a first pole and a second pole, the first and second pole being separated to form a write gap at a pole tip;
  a coil disposed between the first and second poles for producing at the write gap magnetic fields used to record data; and
  a magnetic bias field source disposed proximate to the pole tip for providing a magnetic bias field for enhancing magnetization switching of the pole tip;
  wherein the magnetic bias field is generated by bias-current flowing perpendicularly to an air bearing surface through the magnetic bias field source.

24. The magnetic data storage system of claim 23 wherein the pole tip comprises a longitudinal axis, the magnetic bias field being oriented substantially transverse to the longitudinal axis of the pole tip.

25. The magnetic data storage system of claim 23 wherein the magnetic bias field is transverse to an easy axis of magnetization for the pole tip.

26. An assisted pole tip arrangement, comprising:
  means for providing magnetic fields for recording data on a magnetic recording medium; and
  means, operatively coupled to the means for providing magnetic field for recording data on a magnetic recording medium, for providing a magnetic bias field for enhancing magnetization switching of the means for providing magnetic fields for recording data on a magnetic recording medium;
  wherein the magnetic bias field is generated by bias-current flowing perpendicularly to an air bearing surface through the means for providing a magnetic bias field.

27. A magnetic head, comprising:
  means for providing a path for magnetic fields used to record data on a magnetic recording medium;
  means, coupled to the means for providing a path, for producing the magnetic fields used to record data; and
  means, coupled to the means for providing a path, for providing a magnetic bias field for enhancing magnetization switching of the means for providing a path for magnetic fields;
  wherein the magnetic bias field is generated by bias-current flowing perpendicularly to an air bearing surface through the means for providing a magnetic bias field.

* * * * *